US00RE46320E

(19) United States
(12) Reissued Patent
Fujino et al.

(10) Patent Number: US RE46,320 E
(45) Date of Reissued Patent: Feb. 28, 2017

(54) AIRCRAFT, TOY REPLICA, AND/OR OTHER REPLICAS WITH SURFACE ORNAMENTATION

(71) Applicant: Honda Patents & Technologies North America, LLC, Torrance, CA (US)

(72) Inventors: Michimasa Fujino, Summerfield, NC (US); Chris Osborne, Cary, NC (US)

(73) Assignee: HONDA PATENTS & TECHNOLOGIES NORTH AMERICA, LLC, Torrance, CA (US)

(21) Appl. No.: 29/515,390

(22) Filed: Jan. 22, 2015

Related U.S. Patent Documents

Reissue of:
(64) Patent No.: Des. 674,734
Issued: Jan. 22, 2013
Appl. No.: 29/377,021
Filed: Oct. 15, 2010

(51) LOC (10) Cl. ..... 12-07
(52) U.S. Cl.
USPC ..... D12/319; D12/342
(58) Field of Classification Search
USPC .... D12/319–345; D21/447, 448; 244/13, 15, 244/34 R, 36, 45 A, 45 R, 91, 130, 198, 244/211, 215
CPC ..... B64C 15/12; B64C 29/0033; B64D 27/20
See application file for complete search history.

(56) References Cited

U.S. PATENT DOCUMENTS

D153,291 S * 4/1949 Kartveli ..... D12/343
D166,673 S * 5/1952 Kartveli ..... D12/343
D172,880 S * 8/1954 Johnson et al. ..... D12/342
D173,032 S * 9/1954 Johnson et al. ..... D12/342
D308,281 S * 6/1990 Bergman et al. ..... D2/978
D358,432 S * 5/1995 Harada ..... D21/448
D359,472 S * 6/1995 Day ..... D12/343
(Continued)

OTHER PUBLICATIONS

News & Views; "Honda Aircraft Company to Establish World Headquarters and Production Facility in Greensboro, North Carolina"; http:/www.honda.com/newsandviews/article.aspx?id=2007020934372; 2 pages; Dated Feb. 24, 2015.
(Continued)

*Primary Examiner* — Darlington Ly
(74) *Attorney, Agent, or Firm* — Pearne & Gordon LLP

(57) CLAIM

The ornamental design for an aircraft, *toy replica, and/or other replicas* with [exterior] surface ornamentation, as shown and described.

DESCRIPTION

FIG. 1 is a perspective view of an aircraft, *toy replica, and/or other replicas* with [exterior] surface ornamentation showing our new design;
FIG. 2 is a left perspective view thereof;
FIG. 3 is a right perspective view thereof;
FIG. 4 is a side elevational view thereof, the opposite side elevational view being a mirror image;
FIG. 5 is a top plan view thereof; and,
FIG. 6 is a front elevational view thereof.
The two different stippled shadings represent a contrast in appearance.
*The broken lines in the drawings illustrate portions of the article that form no part of the claimed design.*

1 Claim, 6 Drawing Sheets

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | | |
|---|---|---|---|---|---|
| D414,740 | S | * | 10/1999 | Margaritoff | D12/319 |
| D418,105 | S | * | 12/1999 | Margaritoff | D12/319 |
| D431,522 | S | * | 10/2000 | Fujino | D12/341 |
| 6,308,913 | B1 | * | 10/2001 | Fujino et al. | 244/45 R |
| D469,054 | S | * | 1/2003 | Fujino | D12/319 |
| D500,281 | S | * | 12/2004 | Aruga et al. | D12/319 |
| D576,938 | S | * | 9/2008 | Moon | D12/343 |
| D589,867 | S | * | 4/2009 | Chesne et al. | D12/343 |
| D605,576 | S | * | 12/2009 | Posva | D12/343 |
| D612,792 | S | * | 3/2010 | Guering | D12/343 |
| D617,724 | S | * | 6/2010 | Saint-Jalmes et al. | D12/343 |
| D619,076 | S | * | 7/2010 | Guering | D12/343 |
| D624,479 | S | * | 9/2010 | Guering | D12/343 |
| D624,480 | S | * | 9/2010 | Guering | D12/343 |
| D629,349 | S | * | 12/2010 | Hwang | D12/319 |
| 8,444,093 | B1 | * | 5/2013 | Epstein | 244/134 B |
| 2014/0339365 | A1 | * | 11/2014 | Fujino et al. | 244/129.3 |

OTHER PUBLICATIONS

"Honda Aircraft Company to Establish World Headquarters and Production Facility in Greensboro, NC," http://hondajet.honda.com, [Press Release] Feb. 9, 2007.

* cited by examiner

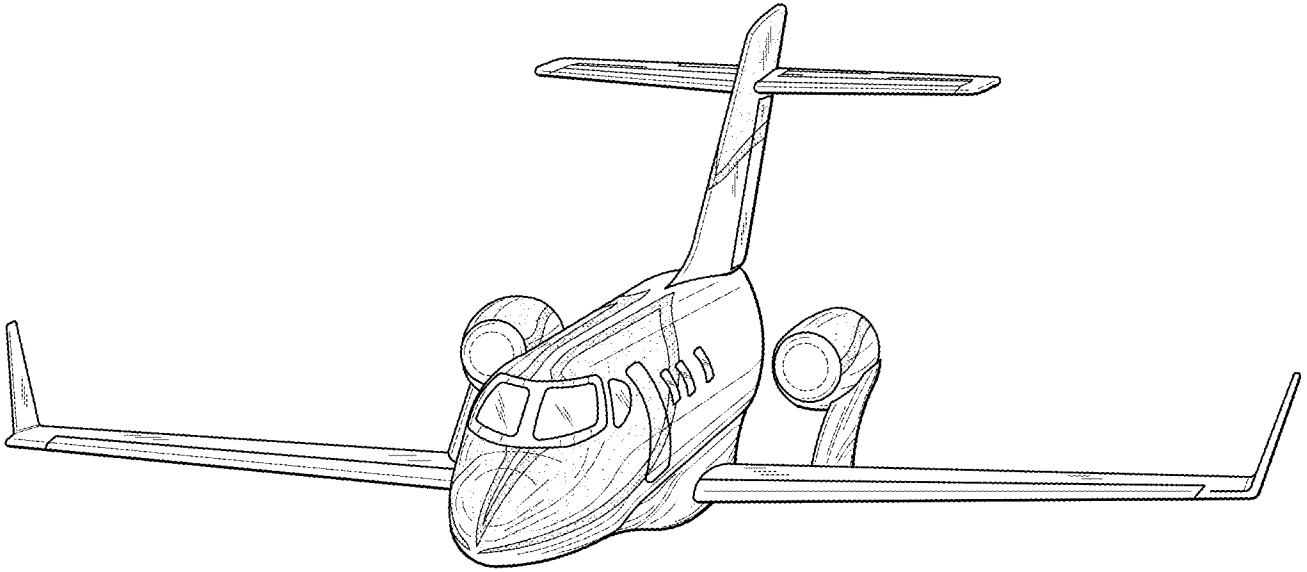
FIG. 1
(AMENDED)

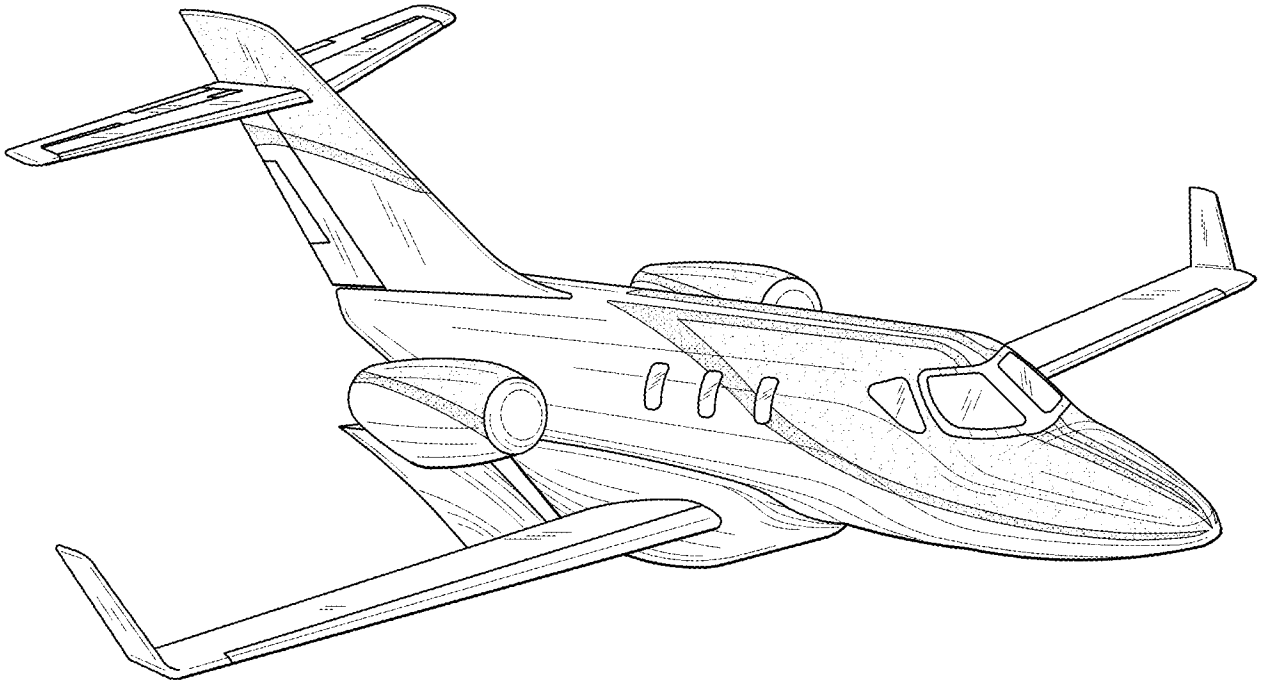
FIG. 2
(AMENDED)

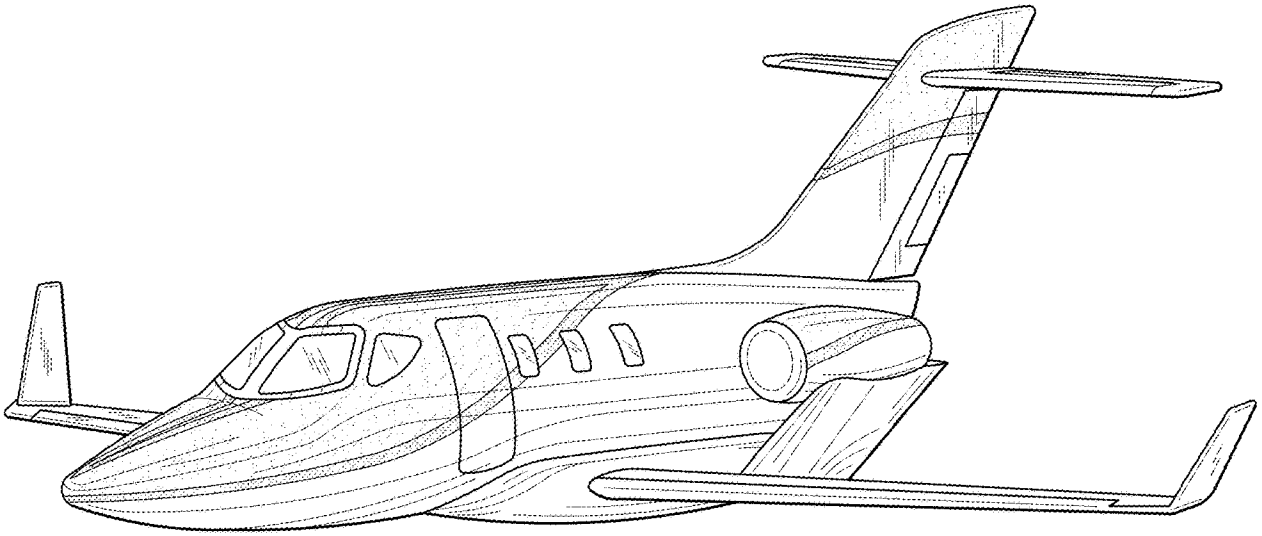
FIG. 3
(AMENDED)

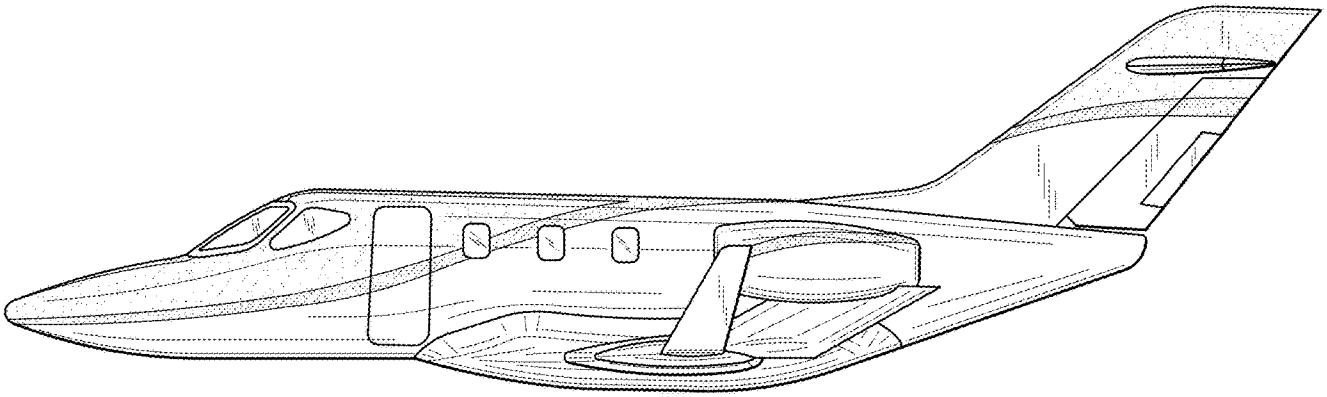
FIG. 4
(AMENDED)

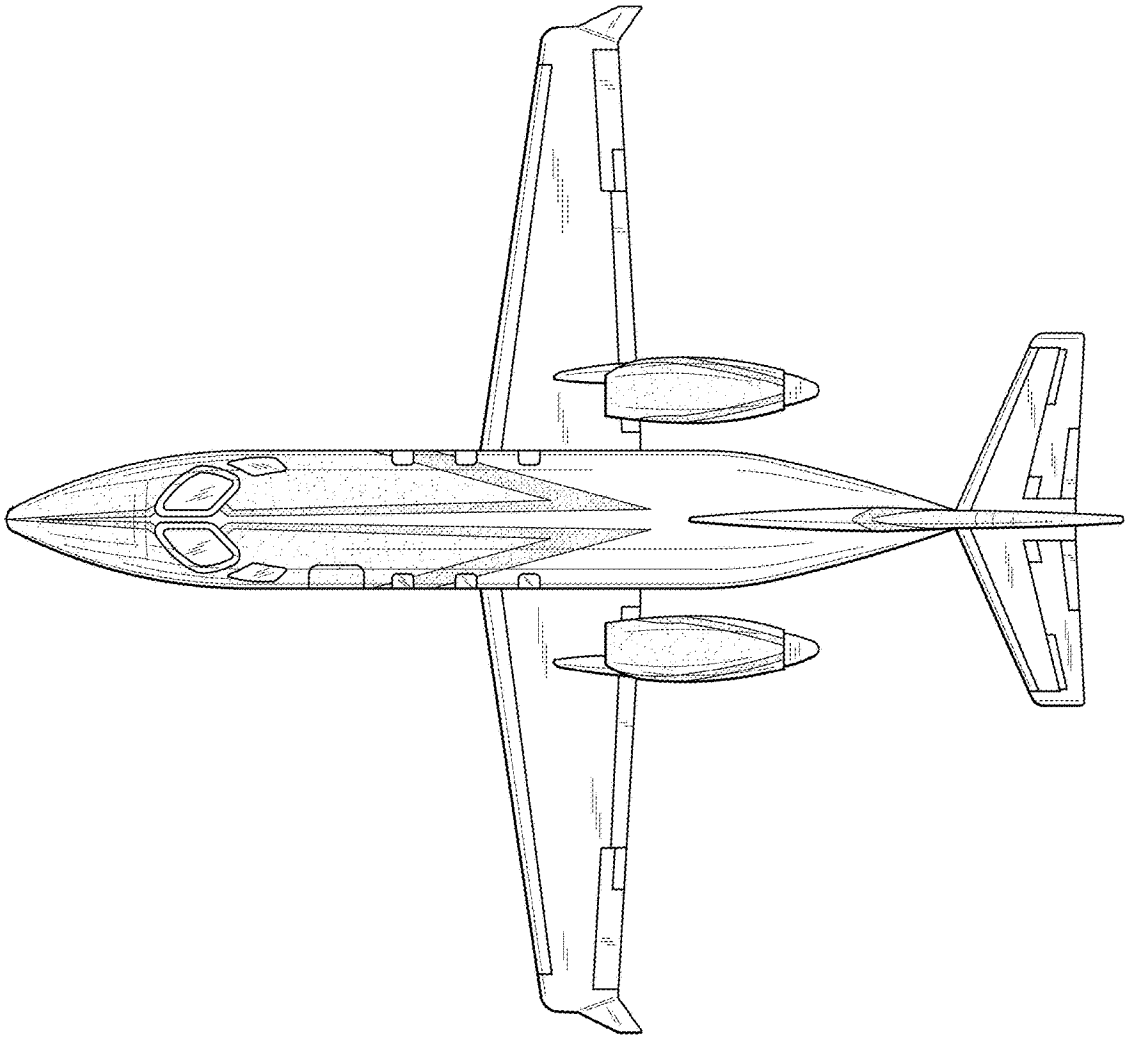
FIG. 5
(AMENDED)

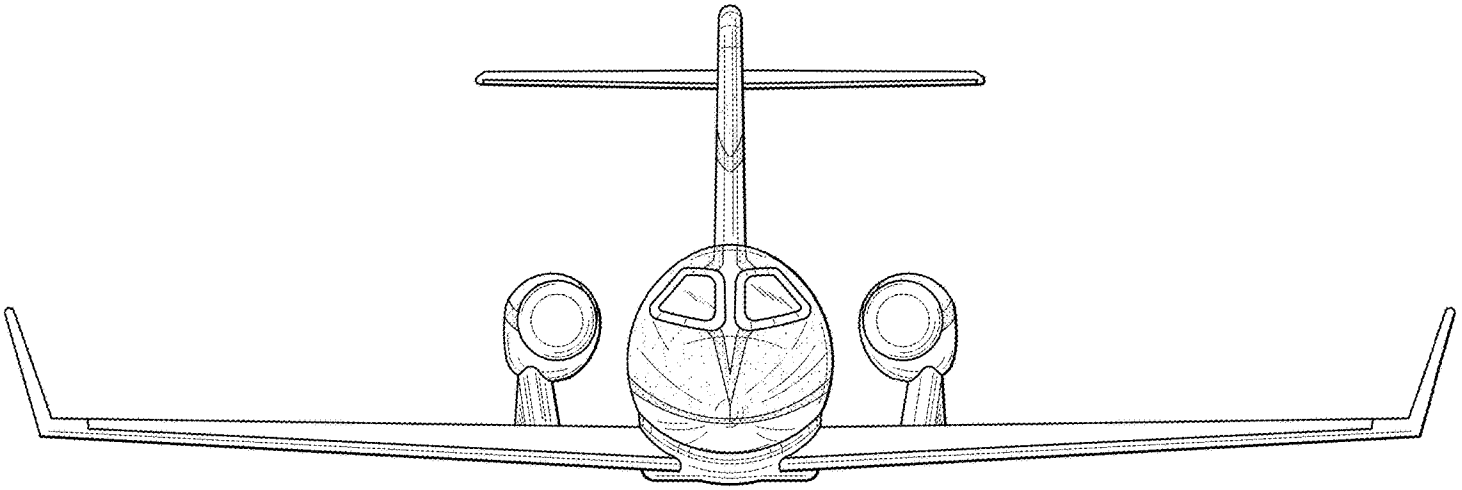
FIG. 6
(AMENDED)